United States Patent [19]

Sumitomo et al.

[11] Patent Number: 5,386,176

[45] Date of Patent: Jan. 31, 1995

[54] CATHODE-RAY TUBE CONTAINING AN INDIUM BORATE PHOSPHOR

[75] Inventors: Miyuki Sumitomo; Katsunori Uchimura, both of Anan, Japan

[73] Assignee: Nuchia Kagaku Kogyo K.K., Tokushima, Japan

[21] Appl. No.: 126,733

[22] Filed: Sep. 27, 1993

Related U.S. Application Data

[63] Continuation of Ser. No. 879,066, May 1, 1992, abandoned, which is a continuation of Ser. No. 497,585, Mar. 22, 1990, abandoned.

[30] Foreign Application Priority Data

Mar. 31, 1989 [JP] Japan .................................. 1-82644

[51] Int. Cl.$^6$ .............................................. H01J 29/20
[52] U.S. Cl. ........................ 313/468; 252/301.3 R; 252/301.4 F; 252/301.4 P
[58] Field of Search ................ 252/301.4 R, 301.4 F; 313/468

[56] References Cited

U.S. PATENT DOCUMENTS 3,394,034 7/1968 Avella ............................. 252/301.4
4,512,912 4/1985 Matsuda et al. .............. 252/301.4 R

FOREIGN PATENT DOCUMENTS 62-1780    1/1987  Japan ............................. 252/301.4 F
62-53390   3/1987  Japan ............................. 252/301.4 F
63-304084  12/1988 Japan ............................. 252/301.4 R

*Primary Examiner*—Jack Cooper
*Attorney, Agent, or Firm*—Nixon & Vanderhye

[57] ABSTRACT

An indium borate phosphor of this invention is represented by formula $(In_{1-a-b-c-d}Tb_aEu_bSm_cM_d)BO_3$ wherein

[1] if $b \neq 0$ and $c \neq 0$,
$1 \times 10^{-6} \leq a \leq 1 \times 10^{-2}$
$0 < b \leq 1 \times 10^{-1}$
$0 < c \leq 1 \times 10^{-3}$
$1 \times 10^{-7} \leq d \leq 1 \times 10^{-2}$
[2] if $b = c = 0$,
$1 \times 10^{-6} \leq a \leq 1 \times 10^{-1}$
$1 \times 10^{-7} \leq d \leq 1 \times 10^{-2}$ and M is at least element selected from the group consisting of Ti, P, Si, and Ge. This phosphor has a higher bonding force between $BO_3$ ions and ions of In or any other contained metal than that of a conventional indium borate phosphor. As a result, the current-brightness and burning characteristics of the indium borate phosphor can be greatly improved.

1 Claim, 5 Drawing Sheets

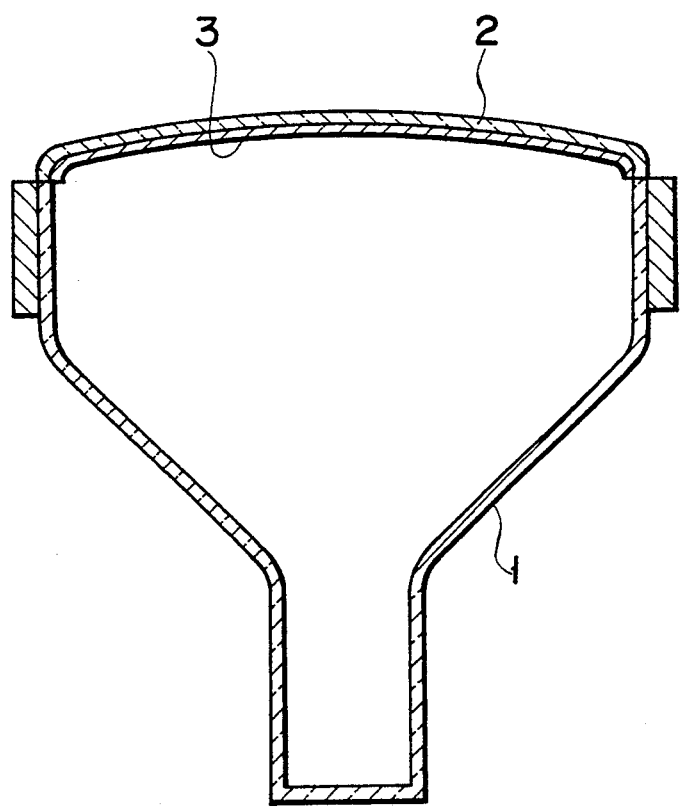
F I G. 2

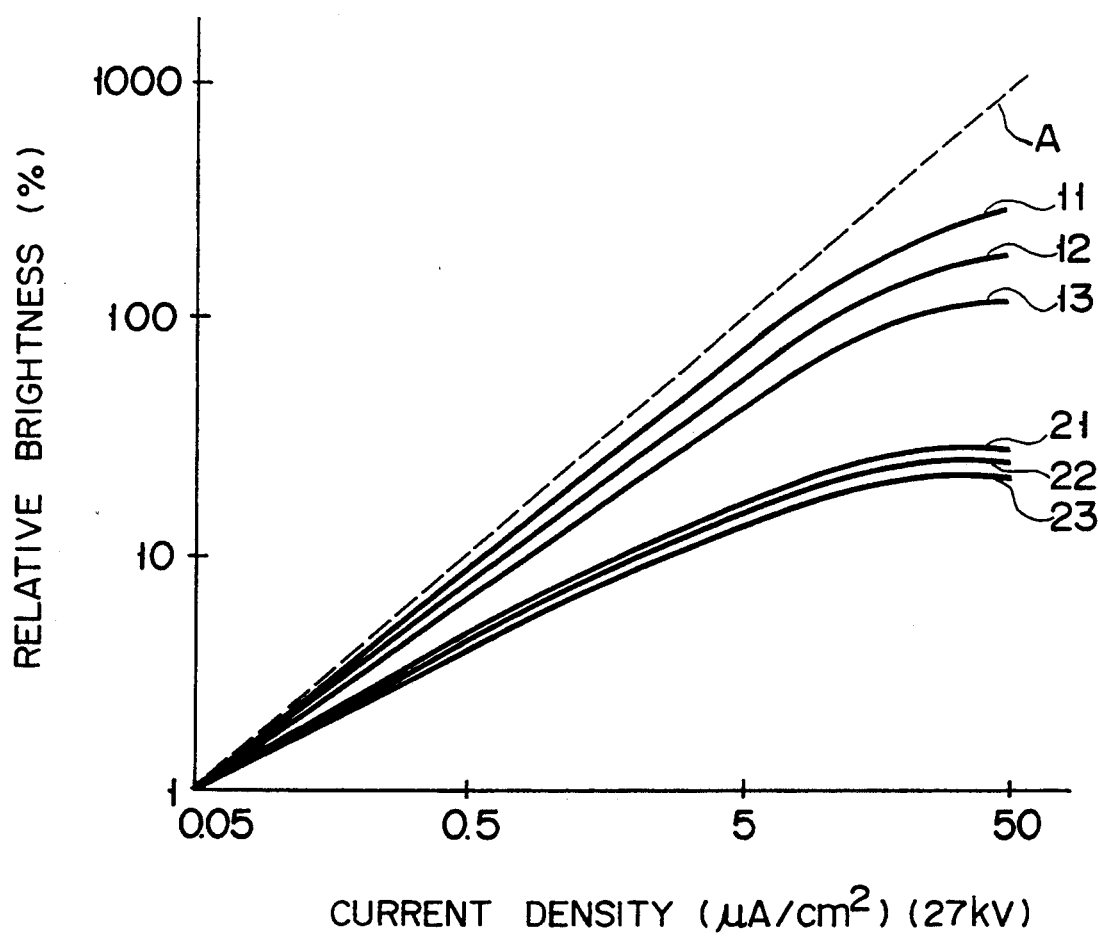
F I G. 3

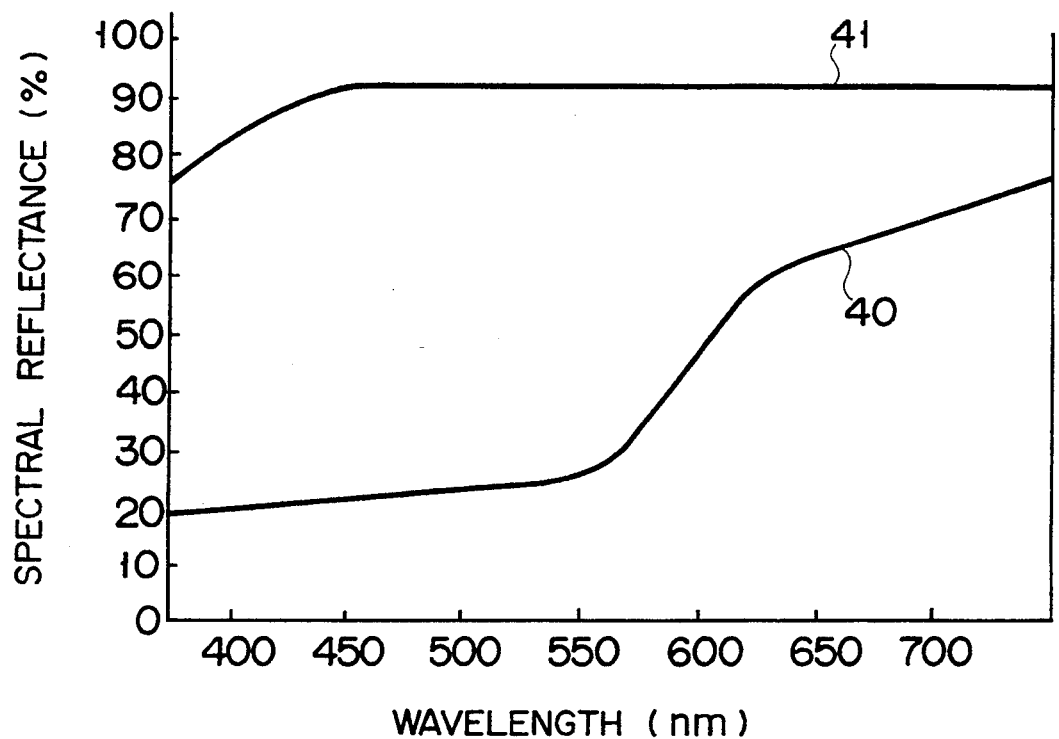
F I G. 4
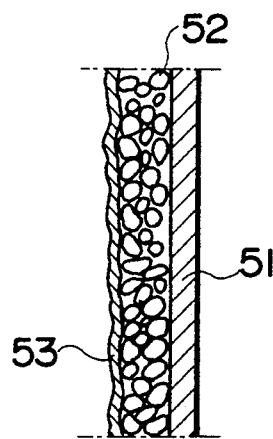
F I G. 5

CATHODE-RAY TUBE CONTAINING AN INDIUM BORATE PHOSPHOR

This is a continuation of application Ser. No. 07/879,066 filed May 1, 1992 which is a continuation of application Ser. No. 07/497,585, filed Mar. 22, 1990, both now abandoned.

BACKGROUND OF THE INVENTION

1. Field of the Invention

The present invention relates to an indium borate phosphor used mainly in a display of a computer terminal or projection tube, and a cathode-ray tube using the indium borate phosphor.

2. Description of the Related Art

An LA phosphor of "$Cd_5Cl(PO_4)_3:Mn$" is known as a conventional phosphor for a display tube of a computer terminal or the like. This phosphor has a high emission brightness and a relatively long 10% afterglow persistance of about 30 msec. When this phosphor is used in a display, it exhibits excellent characteristics. This phosphor however contains 50 wt % or more of toxic cadmium and is not suitable from viewpoints of working environments and pollutions. Strong demand has arisen for a phosphor having excellent characteristics and not containing Cd.

A phosphor of $InBO_3:Eu,Tb$ is proposed as a phosphor which does not contain cadmium and has an afterglow property (Published Unexamined Japanese Patent Application No. 59-105075). A lamp phosphor of $(In,Y,La)BO_3:Eu$ excited with an ultraviolet ray to emit orange light is proposed (Published Unexamined Japanese Patent Application No. 57-51783).

The present inventors made extensive studies and conducted experiments to improve current-brightness characteristics of such indium borate phosphors. The current-brightness characteristics of these phosphors were somewhat improved by adding a predetermined amount of samarium in each phosphor of this type.

According to the present inventors, the emission brightness of the $InBO_3:Eu,Sm$ phosphor could be improved to some extent by adding a small amount of terbium. There is also proposed an indium borate phosphor in which indium is partially substituted with aluminum to improve emission brightness (Published Unexamined Japanese Patent Application No. 61-127784).

These improved indium borate phosphors have been frequently used in place of conventional LA phosphors and P-4 phosphors of [ZnS:Ag+(Zn.Cd)S:Cu] having a large content of Cd.

Since these indium borate phosphors tend to be subjected to current saturation with an increase in current, these phosphors are not deemed to have sufficient current-brightness characteristics as compared with the P-53 phosphor [$Y_3Al_5O_{12}:Tb$] and an ittrium silicate phosphor [$Y_2SiO_5:Tb$] in particular, phosphor films of these indium borate phosphors are discolored (burned) with a lapse of operation time. Since a phosphor film is irradiated with an electron beam having a high current density in particularly a projection tube and a display tube, the phosphor film is subjected to the current saturation and degradation (burning). Burning is a phenomenon occurring when one portion is repeatedly irradiated with an electron beam having a high current density. When the indium borate phosphor is irradiated with an electron beam, In as a constituting element of the phosphor and a small amount of additive such as Tb are reduced. For this reason, metals such In and Tb precipitate from the crystal lattice consisting of bonds of In and $BO_3$. Therefore, discoloring and a decrease in emission brightness of the phosphor film occur.

SUMMARY OF THE INVENTION

It is an object of the present invention to provide an indium borate phosphor excellent in current brightness and burning characteristics and having a high emission brightness.

It is another object of the present invention to provide a cathode-ray tube using this indium borate phosphor.

An indium borate phosphor according to the present invention is characterized in that:

[1] if $b \neq 0$ and $c \neq 0$, then the phosphor is represented by formula $$(In_{1-a-b-c-d}Tb_aEu_bSm_cM_d)BO_3 \qquad (1)$$

wherein
$1 \times 10^{-6} \leq a \leq 1 \times 10^{-2}$
$0 < b < 1 \times 10^{-1}$
$0 < c \leq 1 \times 10^{-3}$
$1 \times 10^{-7} \leq d \leq 1 \times 10^{-2}$ "[2] if $b = c = 0$, then the phosphor is represented by formula $$(In_{1-a-d}Tb_aM_d)BO_3$$

wherein
$1 \times 10^{-6} \leq a \leq 1 \times 10^{-1}$
$1 \times 10^{-7} \leq d \leq 1 \times 10^{-2}$".

and M is at least one element selected from the group consisting of Ti, P, Si, and Ge.

A cathode-ray tube according to the present invention is characterized by comprising a phosphor film containing: an indium borate phosphor defined such that:

(1) if $b \neq 0$ and $c \neq 0$, then the phosphor is represented by formula $$(In_{1-a-b-c-d}Tb_aEu_bsm_cM_d)BO_3 \qquad (1)$$

wherein
$1 \times 10^{-6} \leq a \leq 1 \times \phantom{0}^{-2}$
$0 < b \leq 1 \times 10^{-1}$
$0 < c \leq 1 \times 10^{-3}$
$1 \times 10^{-7} \leq d \leq 1 \times 10^{-2}$ "[2] if $b = c = 0$, then the phosphor is represented by formula $$(In_{1-a-d}Tb_aM_d)BO_3$$

wherein
$1 \times 10^{-6} \leq a \leq 1 \times 10^{-1}$
$1 \times 10^{-7} \leq d \leq 1 \times 10^{-2}$". and M being at least one element selected from the group consisting of Ti, P, Si, and Ge; and at least one phosphor selected from the group consisting of a blue-emitting phosphor, a bluish green-emitting phosphor, a green-emitting phosphor, a white-emitting phosphor, a yellow-emitting phosphor, and an orange-emitting phosphor.

According to the present invention, the indium borate phosphor contains at least one metal element selected from the group consisting of titanium, phosphorus, silicon, and germanium. Therefore, the bonding force between the ions of In or any other contained metal and the $BO_3$ ions can be increased as compared with the conventional indium borate phosphor. As a result, the current-brightness and burning characteristics can be greatly improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a sectional view showing a cathode-ray tube according to an embodiment of the present invention;

FIG. 3 is a graph showing current-brightness characteristics of a phosphor according to the present invention;

FIG. 4 is a graph showing a spectral reflectance of a phosphor applied with a pigment according to the present invention; and FIG. 5 is a sectional view showing part of a faceplate having a phosphor film formed of a phosphor of the present invention thereon.

DETAILED DESCRIPTION OF THE PREFERRED EMBODIMENTS

Figure 1A:
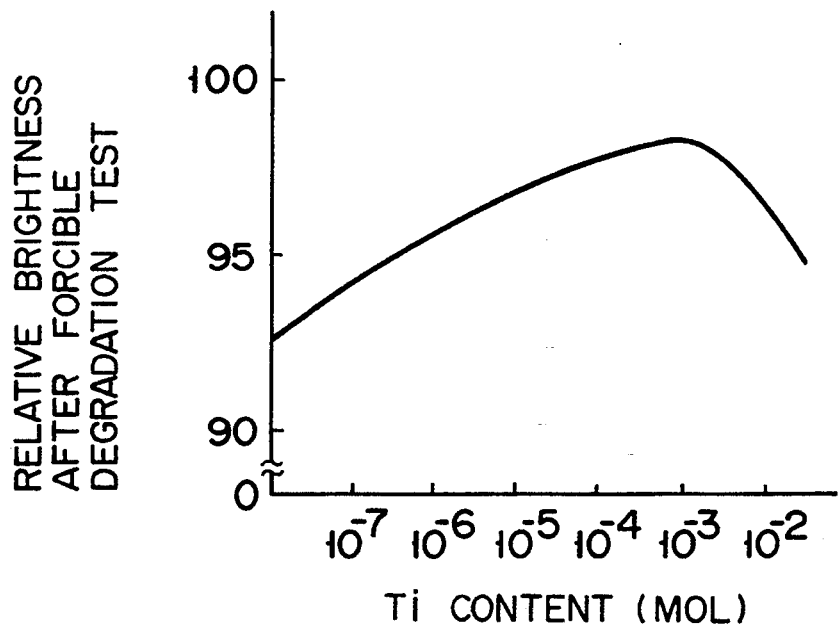
FIG. 1A is a graph showing burning characteristics of a phosphor as a function of a Ti content according to the present invention.

The present inventors repeated experiments to improve current-brightness characteristics of indium borate phosphors by using various additives and found that the current-saturation and burning characteristics were greatly improved by adding at least one of Ti, P, Si, and Ge in an indium borate phosphor in a predetermined amount so as to increase a bonding force between $BO_3$ ions and ions of In and another metal element such as Tb.

An indium borate phosphor according to the present invention is defined such that

[1] if $b \neq 0$ and $c \neq 0$, then the phosphor is represented by $$(In_{1-a-b-c-d}Tb_a Eu_b Sm_c M_d)BO_3 \quad (1)$$

wherein
$1 \times 10^{-6} \leq a \leq 1 \times 10^{-2}$ and preferably $3 \times 10^{-5} \leq a \leq 5 \times 10^{-3}$
$0 < b \leq 1 \times 10^{-1}$ and preferably $1 \times 10^{-4} < b \leq 5 \times 10^{-2}$
$0 < c \leq 1 \times 10^{-3}$ and preferably $3 \times 10^{-5} \leq c \leq 5 \times 10^{-4}$
$1 \times 10^{-7} \leq d \leq 1 \times 10^{-2}$ and preferably $1 \times 10^{-5} \leq d \leq 1 \times 10^{-3}$

[2] if $b=c=0$, then the phosphor is represented by formula $$(In_{1-a-d}Tb_a M_d)BO_3 \quad (2)$$

wherein
$1 \times 10^{-6} \leq a \leq 1 \times 10^{-1}$ and preferably $1 \times 10^{-3} \leq a \leq 5 \times 10^{-1}$
$1 \times 10^{-7} \leq d \leq 1 \times 10^{-2}$ and preferably $1 \times 10^{-5} \leq d \leq 1 \times 10^{-3}$ and M is at least one element selected from the group consisting of Ti, P, Si, and Ge. Of these elements, Ti is most preferable.

If the content a is less than $1 \times 10^{-6}$ or the content d is less than $1 \times 10^{-7}$ the effect of the present invention cannot be enhanced. In this case, the color-emitting components are decreased, and the tone color is disturbed. As a result, the brightness level is lowered. When the content b or d exceeds $1 \times 10^{-2}$ or $1 \times 10^{-3}$, respectively, the effect of these elements is undesirably increased to lower the brightness level. When the content a exceeds $2 \times 10^{-2}$ for $b \neq 0$ and $c \neq 0$ or the content a exceeds $1 \times 10^{-1}$ for $b = c = 0$, then a decrease in brightness similarly occurs.

The present inventors measured the burning characteristics of the component M by changing the content d thereof. A measuring method is given as follows.

A phosphor was applied to Pyrex glass and was then subjected to acrylic lacquer filming and metal backing. The resultant sample was set in a phosphor brightness measuring unit and was measured at an acceleration voltage of 27 kV and a current density of 0.5 $\mu A/cm^2$. An acceleration voltage from an electron gun was set to be 27 kv at a current density of 20 $\mu A/cm^2$, and the phosphor film was scanned with an electron beam over 30 minutes, thereby forcibly degrading the phosphor film. The emission brightness of the degraded phosphor film was measured at an acceleration voltage of 27 kv and a current density of 0.5 $\mu A/cm^2$. The burning characteristics are represented by the emission brightness of the degraded phosphor film when the emission brightness prior to its degradation is given as 100%. The measurement results are shown in FIGS. 1A to 1D.

FIG. 1A shows a measurement result of burning characteristics of a phosphor manufactured by changing the content of titanium. As can be apparent from FIG. 1A, the indium borate phosphor exhibits excellent burning characteristics when the content of titanium falls within the range of $10^{-7}$ to $10^{-2}$ mol and preferably about $10^{-3}$ mol.

Figure 1B:
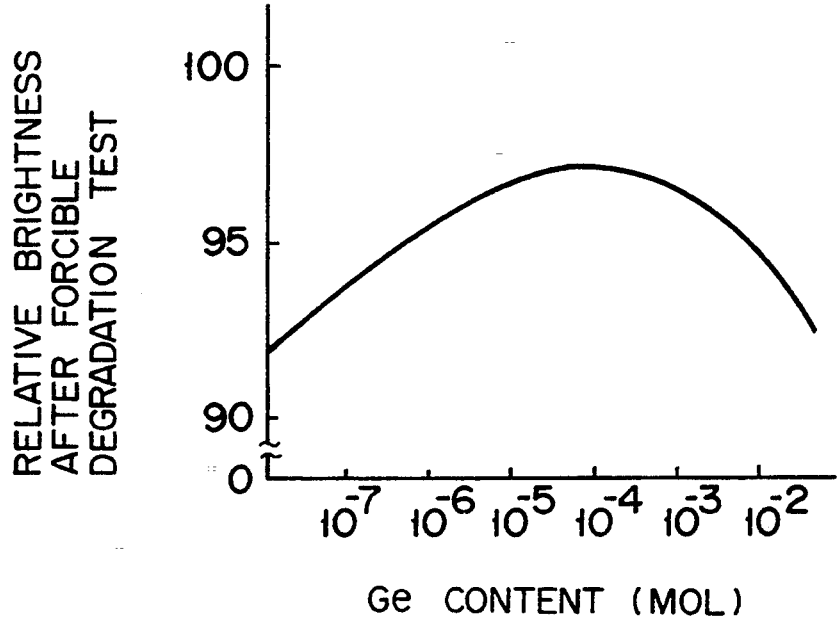
FIG. 1B is a graph showing burning characteristics of a phosphor as a function of a Ge content according to the present invention.

FIG. 1B shows a measurement result of burning characteristics of a phosphor manufactured by changing the content of germanium. As can be apparent from FIG. 1B, the indium borate phosphor exhibits excellent burning characteristics when the content of germanium falls within the range of $10^{-7}$ to $10^{-2}$ mol and preferably about $10^{-4}$ mol.

Figure 1C:
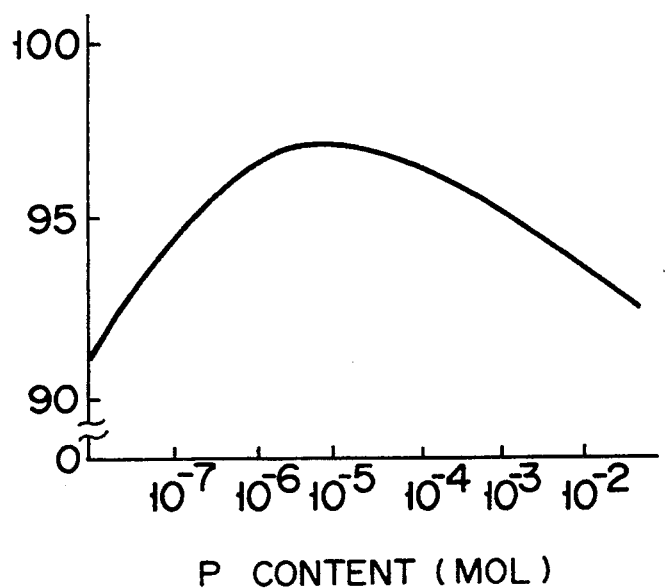
FIG. 1C is a graph showing burning characteristics of a phosphor as a function of a P content according to the present invention.

FIG. 1C shows a measurement result of burning characteristics of a phosphor manufactured by changing the content of phosphorus. As can be apparent from FIG. 1C, the indium borate phosphor exhibits excellent burning characteristics when the content of phosphorus falls within the range of $10^{-7}$ to $10^{-2}$ mol and preferably about $10^{-5}$ mol.

Figure 1D:
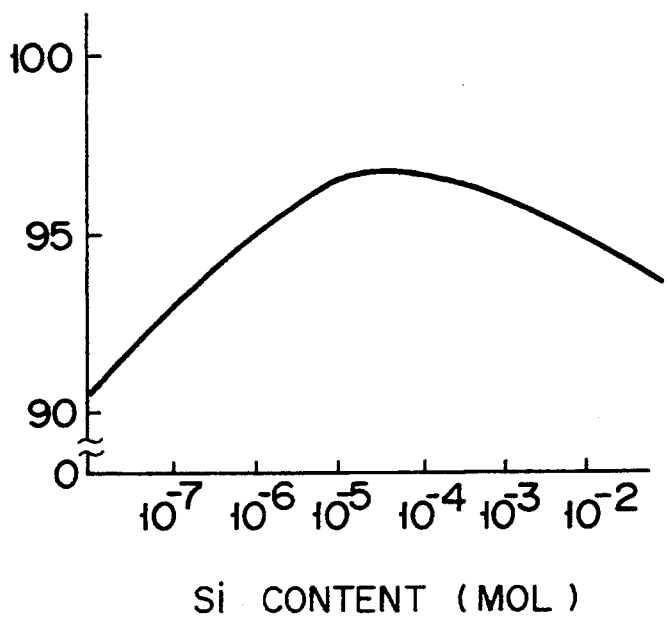
FIG. 1D is a graph showing burning characteristics of a phosphor as a function of an Si content according to the present invention.

FIG. 1D shows a measurement result of burning characteristics of several phosphors manufactured by changing the content of silicon. As can be apparent from FIG. 1D, the indium borate phosphor exhibits excellent burning characteristics when the content of phosphorus falls within the range of $10^{-7}$ to $10^{-2}$ mol and preferably about $10^{-4}$ mol.

The burning characteristics of the indium borate phosphors according to the present invention are changed in accordance with changes in contents of Ti, P, Si, and Ge. These contents have optimal values.

In order to improve the current-brightness and burning characteristics of the phosphors according to the present invention, Sc, Y, La, Gd, Lu, Ba, Sr, Ca, Mg, Li, Na, K, Pr, Al, Ga, Tl, Ce, Dy, Tm, Sn, Zr, Hf, Cr, As, Sb, Bi, V, Nb, or Ta may be added as a metal element in a content of less than about 0.1 mol %. Preferably, Ba is used as a metal added in a small content.

As shown in FIG. 2, the present invention provides a cathode-ray tube comprising a phosphor film 3 of an indium borate phosphor according to the present invention, a faceplate 2 having the phosphor film 3 thereon, and an envelope including the faceplate 2 and a neck 1. The cathode-ray tube has a high emission brightness and, the burning and current-brightness characteristics of the phosphor film are excellent.

The phosphor film formed on the surface of the faceplate is formed by a conventional method such that a slurry containing water and an indium borate phosphor according to the present invention is spin-coated on the faceplate and is heated and dried.

The present invention will be described in detail by way of its examples.

EXAMPLE 1

An indium borate phosphor was manufactured by the following steps:

| | |
|---|---|
| Indium oxide (In$_2$O$_3$) | 300 g |
| Terbium oxide (Tb$_4$O$_7$) | 3.6 g |
| Boric acid (H$_3$BO$_3$) | 240 g |
| Titanium oxide (TiO$_2$) | 0.1 g |

Water was added to the above materials to obtain a paste, and the paste was sufficiently mixed. The resultant mixture was dried at 110° C. for 10 hours. An excessive amount of boric acid was added in the above mixture, and the excess boric acid component was washed off after sintering.

Baking

The mixture was filled in an aluminum crucible and was backed at 1,250° C. for 4 hours.

Post Treatment

The backed body was pulverized and washed with warm water several times. The washed pulverized powder was dried and filtered with a sieve to obtain a phosphor.

A portion of the resultant phosphor was dissolved in aqua regia, and the solution was analyzed by ICP (ion couple plasma spectroscopy). This phosphor contained 140 ppm of titanium. A phosphor as a comparative example (Control 1) was obtained following the same procedures as in Example 1 except that titanium oxide was not added. The burning characteristics of these phosphor samples and relative emission brightness with respect to the emission brightness of Control 1 as 100% were measured. Measurement results are summarized in Table 1. As is apparent from Table 1, the phosphor of Example 1 has an emission brightness higher than that of Control 1 by 5%. The burning characteristics of the phosphor of Example 1 indicated a decrease in brightness of only 2% (i.e., 98% brightness), while those of Control 1 indicate a decrease in brightness of 7% (i.e., 93% brightness).

The current-brightness characteristics of the phosphors of Example 1 and Control 1 were measured, and measurement results are shown in FIG. 3. As is apparent from FIG. 3, the phosphor (curve 21) of Control 1 exhibits large current saturation, whereas the current-brightness characteristic curve (curve 11) of the phosphor of Example 1 is similar to a line A which represents the ideal current-brightness characteristics.

EXAMPLE 2

A phosphor was obtained following the same procedures as in Example 1 except that the following materials are used:

| | |
|---|---|
| Indium oxide (In$_2$O$_3$) | 300 g |
| Terbium oxide (Tb$_4$O$_7$) | 0.04 g |
| Europium oxide (Eu$_2$O$_3$) | 2.3 g |
| Boric acid (H$_3$BO$_3$) | 240 g |
| Germanium oxide (GeO$_2$) | 0.13 g |

A portion of the resultant phosphor was dissolved in aqua regia, and the solution was analyzed by ICP (ion couple plasma spectroscopy). This phosphor contained 150 ppm of germanium.

A phosphor as a comparative example (Control 2) was obtained following the same procedures as in Example 2 except that germanium oxide was not added. The burning characteristics of these phosphor samples and relative emission brightness with respect to the emission brightness of Control 2 as 100% were measured. Measurement results are summarized in Table 1. As is apparent from Table 1, the phosphor of Example 2 has an emission brightness higher than that of Control 2 by 6%. The burning characteristics of the phosphor of Example 2 indicate a brightness as high as 97%, while those of Control 2 indicate a brightness of 92%.

The current-brightness characteristics of the phosphors of Example 2 and Control 2 were measured, and measurement results are shown in FIG. 3. As is apparent from FIG. 3, the phosphor (curve 22) of Control 2 exhibits large current saturation, whereas the current-brightness characteristic curve (curve 12) of the phosphor of Example 2 is similar to the line A which represents the ideal current-brightness characteristics.

EXAMPLE 3

A phosphor was obtained following the same procedures as in Example 1 except that the following materials are used:

| | |
|---|---|
| Indium oxide (In$_2$O$_3$) | 300 g |
| Europium oxide (Eu$_2$O$_3$) | 2.3 g |
| Samarium oxide (Sm$_2$O$_3$) | 0.03 g |
| Boric acid (H$_3$BO$_3$) | 240 g |
| Silicon dioxide (SiO$_2$) | 0.05 g |
| Titanium dioxide (TiO$_2$) | 0.1 g |

A portion of the resultant phosphor was dissolved in aqua regia, and the solution was analyzed by ICP (ion couple plasma spectroscopy). This phosphor contained 70 ppm of silicon and 140 ppm of titanium.

A phosphor as a comparative example (Control 3) was obtained following the same procedures as in Example 3 except that silicon dioxide and titanium dioxide were not added. The burning characteristics of these phosphor samples and relative emission brightness with respect to the emission brightness of Control 3 as 100% were measured. Measurement results are summarized in Table 1. As is apparent from Table 1, the phosphor of Example 3 has an emission brightness higher than that of Control 3 by 4%. The burning characteristics of the phosphor of Example 3 indicate a brightness as high as 98.5%, while those of Control 3 indicate a brightness of 93%.

The current-brightness characteristics of the phosphors of Example 3 and Control 3 were measured, and measurement results are shown in FIG. 3. As is apparent from FIG. 3, the phosphor (curve 23) of Control 3 exhibits large current saturation, whereas the current-brightness characteristic curve (curve 13) of the phosphor of Example 3 is similar to the line A which represents the ideal current-brightness characteristics.

TABLE 1

| | Burning Charac-teristics | Relative Emission Brigthness | Remarks |
|---|---|---|---|
| Example 1 | 98% | 105% | contains 140 ppm of Ti |
| Control 1 | 93% | 100% | does not contain Ti |
| Example 2 | 97% | 106% | contains 150 ppm of Ge |
| Control 2 | 92% | 100% | does not contain Ge |
| Example 3 | 98.5% | 100% | Si = 70 ppm and Si nor Ti |
| Control 3 | 93% | 100% | contains neither Si nor Ti |

EXAMPLE 4

A pigment can be attached to surfaces of particles of an indium borate phosphor to improve image contrast. An indium borate phosphor applied with a pigment can be manufactured by the following steps.

1 kg of the $InBO_3$:Eu,Sm phosphor containing Si and Ti and prepared in Example 3 was dispersed in 5 l of water, and 13 g of colcothar were added thereto and stirred and mixed sufficiently therewith. 10 ml of a 5% gelatin (JIS Type 1) and 5 ml of a 5% sodium polyacrylate were added to the mixture and were kept stirred for 10 minutes. Thereafter, a 20% acetic acid was added to control a pH value of the solution to 4. This suspension was aged for 10 to 15 minutes, filtered, and washed with water.

A spectral reflectance of the resultant indium borate phosphor attached with a pigment is represented by a curve 40 in FIG. 4. A spectral reflectance of a phosphor not attached with any pigment obtained in Example 3 is represented by a curve 41. As is apparent from FIG. 4, the indium borate phosphor attached with a pigment absorbs light of a short-wavelength range unlike the indium borate phosphor not applied with any pigment. For this reason, the contrast can be improved. In addition, the burning characteristics of the indium borate phosphor attached with a pigment were measured, and an excellent result as in Example 3 was obtained. In addition, its emission brightness was also high.

Colcothar was attached to the orange-emitting indium borate phosphor in Example 4. However, the type of pigment is not limited to this. Cobalt aliminate, cobalt-zinc titanate, or the like as a green pigment can be attached to a green-emitting indium borate phosphor.

An amount of pigment generally falls within the range of 0.001 to 2.0 wt %.

EXAMPLE 5

The green-emitting phosphor obtained in Example 1, the orange-emitting phosphor obtained in Example 3, and the blue-emitting ZnS:Ag,Al phosphor were mixed in the following mixing ratio:

Ti-containing $InBO_3$:Tb green-emitting phosphor: 45.0 wt %

Ti,Si-containing $InBO_3$:Eu,Sm orange-emitting phosphor: 29.5 wt %

ZnS:Ag,Al blue-emitting phosphor: 25.5 wt %

A precipitated film was formed on a faceplate by using the resultant mixture. FIG. 5 is a sectional view showing part of the faceplate applied with a phosphor film. As shown in FIG. 5, a phosphor mixture is applied to a faceplate 51 and dried to form a phosphor film 52. An Al metal backing film 53 is generally formed on the phosphor film 52. As shown in FIG. 2, a faceplate 3 obtained in this manner and an envelope 2 are assembled to obtain a cathode-ray tube.

As a comparison example, a cathode-ray tube (Control 5) was obtained following the Example 5 except that the phosphors obtained in Control 1 and Control 3 were used in place of the Ti-containing $InBO_3$:Tb green-emitting phosphor (Example 1) and the Ti,Si-containing $InBO_3$:Eu,Sm orange-emitting phosphor (Example 3). An acceleration voltage of 27 kV at a current density of 5 μA was applied to these cathode-ray tubes for 100 hours, and their burning characteristics were measured. The emission brightness of the phosphor of Control 5 was decreased by 10% while that of Example 5 was decreased by only 5.5%. When the current-brightness characteristics of the phosphor of Example 5 were measured, they were excellent.

In Example 5, the ZnS:Ag,Al phosphor is used as a blue-emitting phosphor to obtain white emission light. The indium borate phosphor can be mixed with another phosphor and can be used as a white- or orange-emitting cathode-ray tube phosphor.

Examples of the phosphors mixed with the indium borate phosphor are as follows:

As green-emitting phosphors, $Zn_2SiO_4$:Mn, $Zn_2SiO_4$:Mn,As, $Y_3Al_5O_{12}$:Tb, $Y_2O_2S$:Tb, ZnO:Zn, ZnS:Cu,Al, ZnS:Cu,Au,Al, $Gd_2O_2S$:Tb, and $Y_2SiO_5$:Tb can be used.

As bluish white-emitting phosphors, ZnS:Ag, $YAlO_3$:Ce, $Y_2SiO_5$:Ce, ZnS:Zn, and $Y_2O_2S$:Tb can be used.

As yellow-emitting phosphors, $Y_3Al_5O_{12}$:Ce and $Y_3(Al,Ga)_5O_{12}$:Ce can be used.

As orange-emitting phosphors, $CaSiO_3$:Pb,Mn and $(Zn.Mg)F_2$:Mn can be used.

As red-emitting phosphors, $Y_2O_3$:Eu, $Y_2O_2S$:Eu, $(Zn.Ca)_2(PO_4)_3$:Mn, $YVO_4$:Eu, and $MgSiO_3$:Mn can be used.

Additional advantages and modifications will readily occur to those skilled in the art. Therefore, the invention in its broader aspects is not limited to the specific details, representative devices, and illustrated examples shown and described herein. Accordingly, various modifications may by without departing from the spirit or scope of the general inventive concept as defined by the appended claims and their equivalents.

What is claimed is:

1. A cathode ray tube comprising a phosphor film which emits a green light upon excitation by an electron beam and exhibits improved current-brightness and burning characteristics, said phosphor film containing an indium borate phosphor represented by the formula:

$$(In_{1-a-d}Tb_a Ti_d)BO_3$$

wherein, $1 \times 10^{-6} \leq a \leq 1 \times 10^{-1}$
$1 \times 10^{-7} \leq d \leq 1 \times 10^{-2}$.

* * * * *